United States Patent
Aberethy, Jr. et al.

(10) Patent No.: US 8,594,634 B2
(45) Date of Patent: Nov. 26, 2013

(54) MISSED CALL INTEGRATION WITH VOICEMAIL AND GRANULAR ACCESS TO VOICEMAIL

(75) Inventors: Michael N. Aberethy, Jr., Pflugerville, TX (US); Travis M. Grigsby, Austin, TX (US); Michael A. Paolini, Austin, TX (US); Lakshmi Potluri, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1782 days.

(21) Appl. No.: 11/445,639

(22) Filed: Jun. 2, 2006

(65) Prior Publication Data

US 2007/0280457 A1 Dec. 6, 2007

(51) Int. Cl.
*H04Q 7/20* (2006.01)
*H04M 11/10* (2006.01)
*H04M 3/42* (2006.01)
*H04M 1/64* (2006.01)
*H04L 12/16* (2006.01)
*H04W 4/14* (2009.01)
*G06F 15/16* (2006.01)

(52) U.S. Cl.
USPC .... 455/412.1; 370/259; 379/67.1; 455/412.2; 455/413; 455/466; 709/219

(58) Field of Classification Search
USPC ......... 370/310, 259, 271, 352–356, 389, 392; 379/67.1–88.28; 455/415, 466, 455/412.1–413; 709/219
See application file for complete search history.

(56) References Cited

U.S. PATENT DOCUMENTS

| | | | |
|---|---|---|---|
| 6,882,828 B1* | 4/2005 | Kregel | 455/70 |
| 7,248,864 B1* | 7/2007 | Robertson et al. | 455/417 |
| 7,280,652 B2* | 10/2007 | Bocking et al. | 379/355.02 |
| 7,532,913 B2* | 5/2009 | Doulton | 455/566 |
| 7,609,686 B1* | 10/2009 | McNamara et al. | 370/356 |
| 7,623,850 B1* | 11/2009 | Garg et al. | 455/417 |
| 7,702,315 B2* | 4/2010 | Engstrom et al. | 455/412.1 |
| 7,783,283 B2* | 8/2010 | Kuusinen et al. | 455/412.2 |
| 7,949,331 B1* | 5/2011 | Garg et al. | 455/417 |
| 7,978,833 B2* | 7/2011 | Urban et al. | 379/142.04 |
| 8,041,020 B2* | 10/2011 | Drewry et al. | 379/211.01 |
| 8,155,624 B2* | 4/2012 | Khoury | 455/412.1 |
| 2002/0154745 A1* | 10/2002 | Shtivelman | 379/88.12 |
| 2004/0137955 A1 | 7/2004 | Engstrom et al. | |
| 2005/0020247 A1 | 1/2005 | Lakkala | |
| 2005/0020316 A1 | 1/2005 | Mahini | |
| 2005/0111631 A1* | 5/2005 | Jordan, Jr. | 379/88.12 |
| 2005/0111635 A1* | 5/2005 | Caputo et al. | 379/88.22 |

(Continued)

*Primary Examiner* — Asad Nawaz
*Assistant Examiner* — Wutchung Chu
(74) *Attorney, Agent, or Firm* — Yudell Isidore Ng Russell PLLC

(57) ABSTRACT

A method, system and computer program product for enhancing a phone device such as a cell phone by automatically linking/associating caller identifying information with voicemail notification so that the phone's user (callee) receives notification of which missed call(s) generated a voicemail/SMS notification. The voicemail notification displays a notification identification (NID) associated with the particular caller number that generated the voicemail, and each voicemail displayed via the associated NID on the phone's display when the user selects the voicemail. Also, voicemail notification (icon or check mark) is added to the missed call log and displayed next to the missed call number that generated a voicemail. Additionally, granular user-directed access to voicemail is provided whereby the user of the phone device accesses the voicemail from the missed call (or received call) log and is able to listen to a specific voicemail left by a selected one of the listed missed calls/callee.

20 Claims, 3 Drawing Sheets

(56) References Cited

U.S. PATENT DOCUMENTS

| | | | |
|---|---|---|---|
| 2005/0186945 A1* | 8/2005 | Mazor | 455/413 |
| 2007/0207785 A1* | 9/2007 | Chatterjee et al. | 455/414.1 |
| 2008/0207176 A1* | 8/2008 | Brackbill et al. | 455/413 |
| 2009/0136009 A1* | 5/2009 | Vishik et al. | 379/88.13 |
| 2010/0329434 A1* | 12/2010 | Othmer et al. | 379/88.13 |

\* cited by examiner

MISSED CALL INTEGRATION WITH VOICEMAIL AND GRANULAR ACCESS TO VOICEMAIL

RELATED APPLICATIONS

The present invention is related to the subject matter of commonly assigned, co-pending U.S. patent application Ser. No. 11/445,698, titled: "Caller Directed Voicemail Response," which is filed concurrently herewith. Relevant content of that co-pending application is hereby incorporated herein by reference.

BACKGROUND OF THE INVENTION

1. Technical Field

The present invention relates generally to telephone systems and in particular to missed call functions on a telephone. Still more particularly, the present invention relates to a method and system for handling missed calls that generate voicemails on a telephone.

2. Description of the Related Art

A growing number of conventional telephone devices are designed with intelligent functions, such as voicemail notification and missed call notification. When a received phone call is not answered by the callee, the call is flagged and recorded as a missed call in a missed call log (or the received call log in some phones). Also, typically when a call is not answered, the missed call is forwarded to voicemail, and the caller is then prompted to leave a message for the phone user (callee), who may later access and listen to the voicemail, typically at the user's convenience.

Conventional phones do not associate voicemail with missed calls, even though there is logically a strong conceptual tie in the user's mind that the voicemail(s) should be associated with a particular missed call(s). For example, whenever a single missed call results in a voicemail being left by the caller, the user (callee) receives a missed call notification as well as a voicemail notification (icon). The user is thus able to associate the voicemail with the call that was just left. This scenario assumes that the user is around to observe the missed call and subsequent voicemail notification when they first occur.

However, in many cases, the user is not in vicinity of the phone and/or chooses to ignore activities occurring on the phone for a period of time. During such periods, multiple missed calls may be registered, some of which may have an associated voicemail. When the user finally pays attention to the events that have occurred on his phone during that time period, the user is provided a single notification that one or more missed calls occurred and a single voicemail notification that one or more voicemails were recorded in the phone's voice mailbox. There is no correlation between the missed calls and the voicemails.

For such a correlation to be made by the user, the user has to mentally keep track of each missed call and each voicemail notification received, immediately following that missed call. This method of tracking voicemails to missed calls is error prone for many reasons, including for example: (1) the user is forced to keep mental track of multiple phone numbers that may have left a voicemail among a larger number of callers, some of whom did not leave a voicemail; and (2) in some phones, earlier voicemail and missed call notifications may be presented periodically (for legacy voicemails) regardless of whether the most recent missed call resulted in the caller leaving a new voicemail. The user is thus not sure whether the voicemail notification corresponds to a new message or an existing message, which was generated from a most recent missed call or a previous missed call.

For example, the user may be waiting on information from a particular caller and receives three missed calls, one from the caller and two from telemarketers. Only one (or two) voicemails is/are left for the user, and the user currently has no way of discerning which one of the three calls resulted in the voicemail. The lack of association between the voicemail and the messages forces the user to listen to all voicemail(s), only to find out that the voicemail(s) are from telemarketers. The user is frustrated as he would have preferred to not have to listen to voicemail(s) from telemarketers. With current voicemail and missed call systems, however, the time wasted in listening to the voicemail could not be avoided, without the user potentially missing important information left by the particular caller.

SUMMARY OF THE INVENTION

Disclosed is a method, system and computer program product for enhancing a phone device such as a cell phone by automatically linking/associating caller identifying information with voicemail notification so that the phone's user (callee) receives notification of which missed call(s) generated a voicemail/SMS notification. Existing voicemail notification utility and missed-call logging functionality are enhanced with a cross-notification feature, whereby the voicemail notification displays a notification identification (NID) associated with the particular caller number that generated the voicemail. Each voicemail is provided an associated NID that is displayed to the user on the phone's display when the user selects the voicemail.

When the user accesses voicemail, a listing of the NIDs with recorded voicemail is presented to provide the user with unequivocal notification of which missed calls generated the stored voicemails. In one embodiment, only NIDs of recorded voicemails are presented in the voicemail view. In another embodiment, the NIDs are presented with time-of-receipt and/or other information, such as length of message, and urgency of message.

In another embodiment, a voicemail notification (icon or check mark) is added to the missed call log and displayed next to the missed call number that generated a voicemail. In this embodiment, a user opens the missed call log and is presented with the missed calls and voicemail icons next to those numbers (or callers) that generated voicemails. In a related implementation, the user is provided with the NID list while the voicemail sign-in procedures are being completed so the user is able to view which voicemails exist and either proceed with the sign in or abandon the sign in (if no voicemail-associated number or caller of interest is listed as having left a voicemail).

In one embodiment, the user of the phone device accesses the voicemail from the missed call (or received call) log and is able to listen to a specific voicemail left by a selected one of the listed missed calls/callee. In this manner, granular user-directed access to voicemail is provided via the phone device. In one embodiment, the voicemail utility accesses the voicemail (in the background) concurrently with displaying the missed call list to the user to enable this granular access. Thus, when the user decides to access only a particular voicemail, the voice mailbox is already opened for this granular access.

In one embodiment, the enhancement to the voicemail functionality enables the device to automatically display the list of missed calls that generated voicemails when the user first interacts with the phone device following a period in which at least one missed call is recorded. Also, when the user of the phone selects the voicemail button to access voicemail, the voicemail utility displays on the device's display the list of missed calls that generated the recorded voicemails. By displaying/referencing this list of missed-calls-with-voicemail-message(s), the user may select particular ones of the voicemail to open and listen to rather than being forced to listen to all recorded voicemails. This feature is particularly useful for screening our voicemails recorded from numbers/callers for which the user has no interest, e.g., a solicitation voicemail or voicemail from an unknown number.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, phone device and computer program product for enhancing the voicemail and missed call functionality of the phone device (hereinafter described as and with specific reference to a cell phone) to (1) alert a user of the device which particular missed call(s) resulted in a voicemail and (2) enable the user to granularly access voicemail associated with specific missed calls. The phone device is programmed with a utility that links the missed calls to voicemails that are left by the particular caller and identifies to the user of the phone device which call(s) among those received (and missed) resulted in voicemail(s). Using this information, the user is able to ascertain whether or not the user wishes to listen to a recorded voicemail (perhaps before returning the call) and which specific ones of the recorded voicemails that user actually wishes to access. The user is then able to selectively listen to voicemail from different callers while not listen to those of other callers, and the user may access voicemail granularly.

Figure 1A:
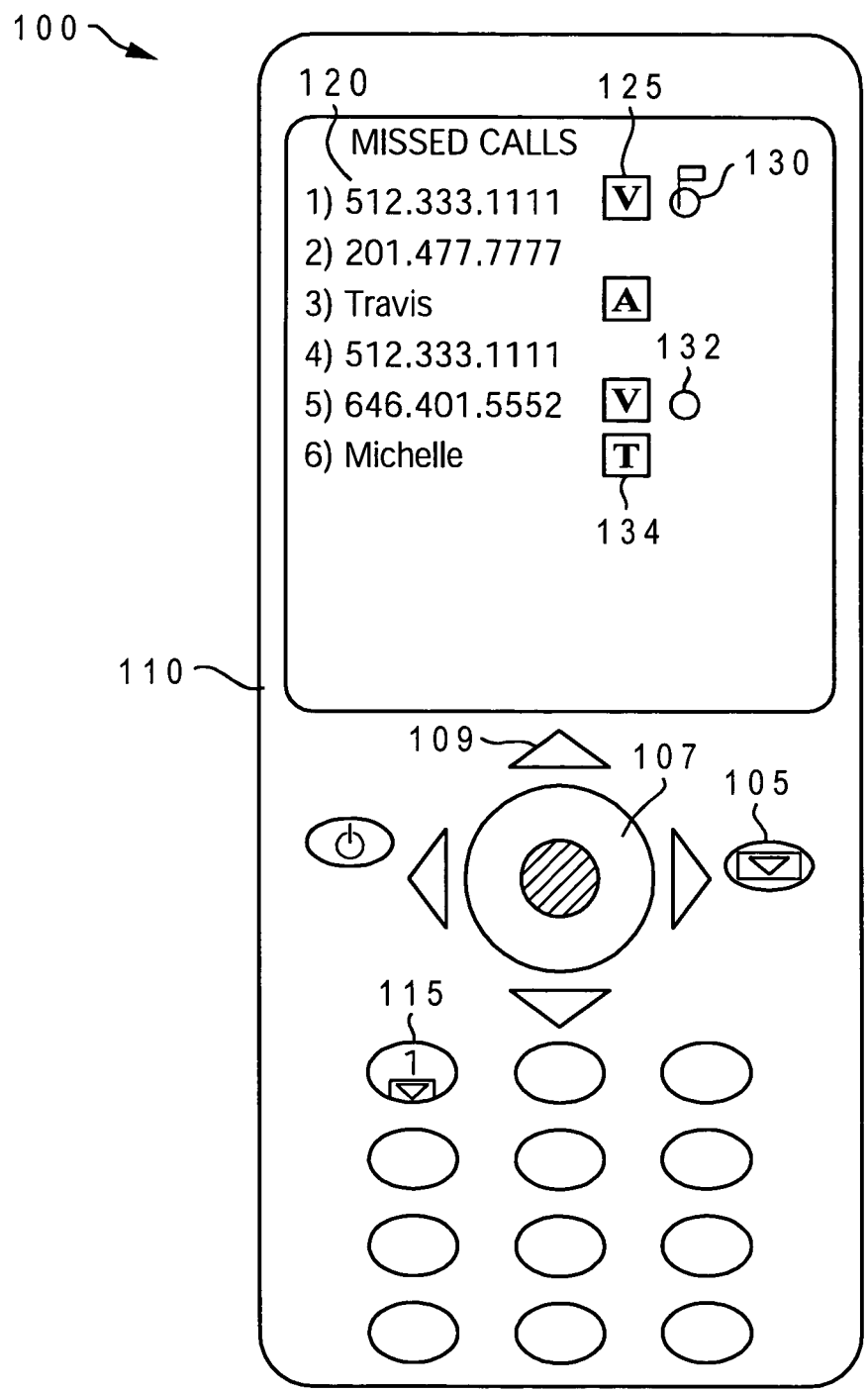
FIG. 1A illustrates an example phone device configured to provide a display of missed-call-with-voicemail notification functionality according to one embodiment of the invention.

Referring now to the figures and in particular to FIG. 1A, wherein is provided an illustration of a phone device configured with missed-call-with voicemail notification functionality in accordance with the invention. As shown, cell phone 100 comprises display 110 and numeric keypad 115 and function keypad 107 and selection buttons 109. Additionally, cell phone 100 comprises a voicemail key 105, which when depressed enables access to the voice mailbox and/or voicemail features, including those described herein. Display 110 is illustrated with a missed call log within which is presented missed-call numbers 120, and voicemail notification icons 125 next to those missed calls that resulted in a voicemail. FIG. 1A also illustrates a plurality of caller-directive/response icons 130, 132, 134 utilized as described in the related co-pending patent application, Ser. No. 11/445,698.

Figure 1B:
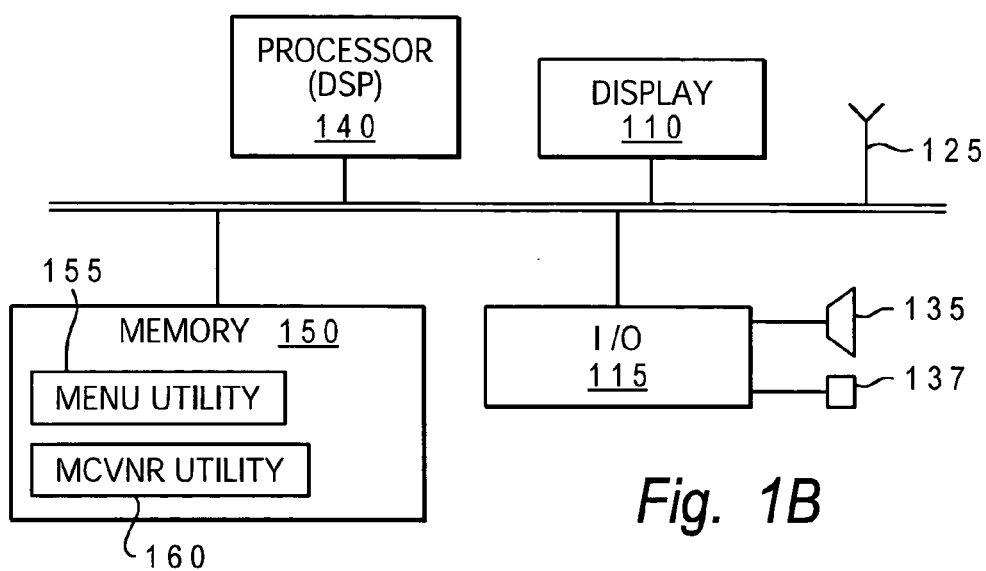
FIG. 1B illustrates one configuration of the internal components of an example phone device configured to support a missed-call-with-voicemail notification and response functionality according to one embodiment of the invention.

FIG. 1B illustrates internal components (hardware and software utility) of an example cellular phone device (cell phone) 100 within which the various features of the invention are advantageously implemented, according to one embodiment. For purposes of the illustration, the features described herein are described as being implemented within a cell phone 100 but is equally applicable to other types of phones (land-line/PSTN phones) that provide electronic missed call logs and digital voicemail notification services.

FIG. 1B illustrates an example configuration of phone device 100 complete with functional components required to provide the features of the invention. Phone device 100 is assumed to be a programmable device with processing/programming functionality. Thus phone device 100 comprises a processor (e.g., digital signal processor) 140 coupled to memory 150 via a bus interface 145. Also coupled to bus interface 145 are display device 110, an I/O device 115 (including numeric and function-keys keyboard), speaker 135 and microphone 137, and antenna 125

Located within memory 150 and executed on processor 140 are software utilities, including menu utility 155, and missed call and voicemail notification and response (MCVNR) utility 160. MCVNR utility 160 is illustrated as a separate component from menu utility 155, but may be a sub-component of menu utility 155. When executed, menu utility 155 enables access to the standard menu options found in programmable phones, such as voicemail setup and access, display of call logs, and others. According to the invention, MCVNR utility 160 comprises the functionality to tracked missed calls, link voicemails to the associated missed calls, display identifying information about the call number/callee who recorded each voicemail, and other features/functionality described below and as illustrated by FIG. 2.

In one embodiment, function-keys of I/O device 115 includes at least one menu button and/or a voicemail button that enables user-access to functionality provided by a voicemail utility and a missed call utility, which may both be accessible via a menu utility. In one embodiment, I/O device 115 includes a new selectable MCVNR button 115, which enables setup and or activation of an MCVNR utility, described below.

In one embodiment, the MCVNR utility is pre-programmed into the phone, and thus the phone is bought off-the-shelf with this pre-programmed functionality. In another embodiment, using more advanced phone devices/mechanisms, the functionality is programmed (i.e., the utility is uploaded) into the phone post-manufacture by the end user or service provider. The cell phone is initially programmed with the standard voicemail and call log features. The user then upgrades (via direct download from a website, software product, or from the phone service provider) the phone device's software to include code that enables MCVNR utility. This latter embodiment applies to any digitally programmable phones, which are capable of being enhanced with a later-added software package on a desktop computer (or similar device) supporting VOIP operation.

Figure 2:
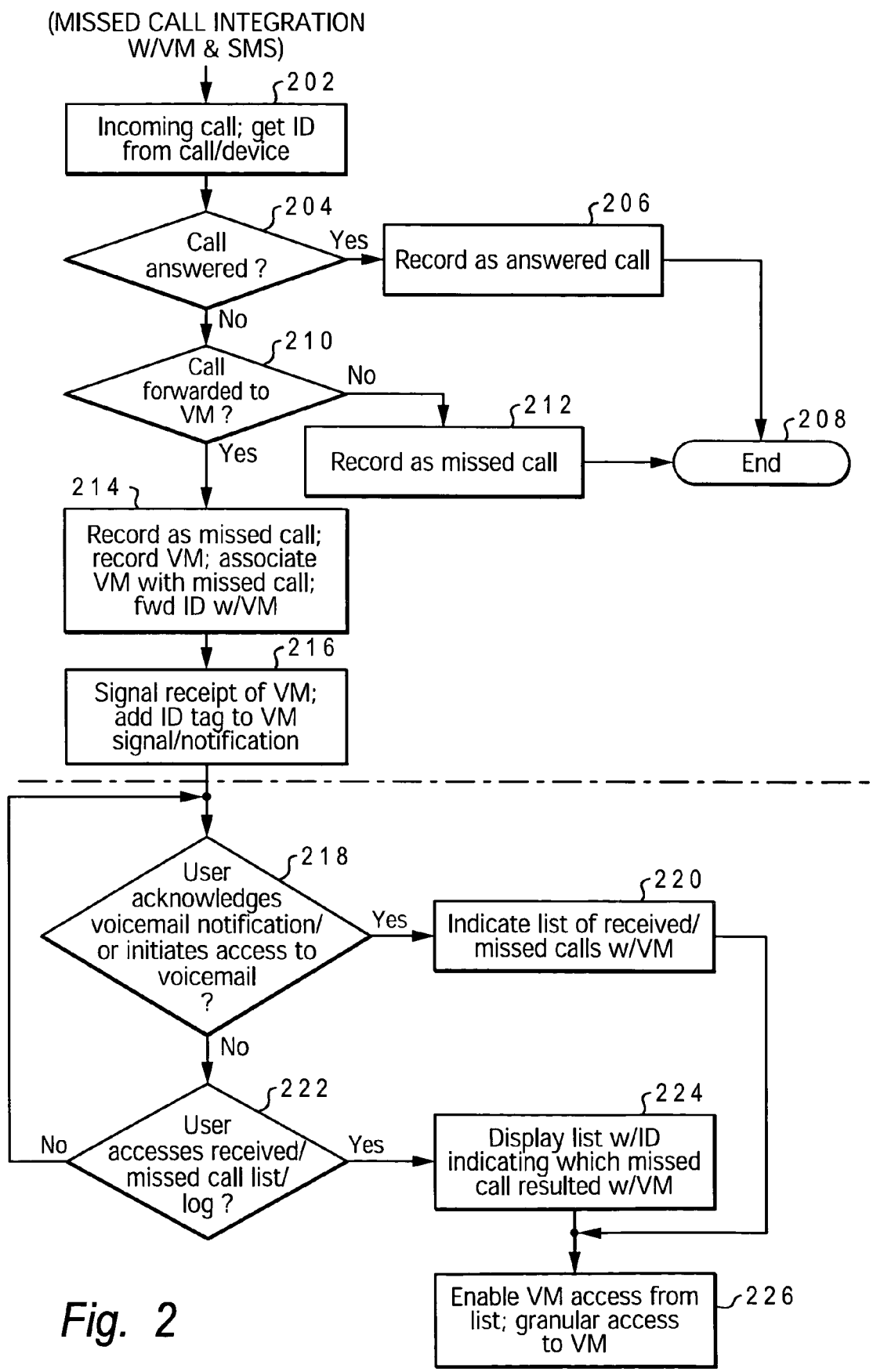
FIG. 2 is a flow chart of the process by which the missed call with voicemail notification and response functionality is implemented according to one embodiment of the invention.

Turning to FIG. 2, there is illustrated the flow chart of the process for completing the functional features of the MCVNR utility. Two sets of features are enabled by the utility, those related to receiving and responding to a missed call that results in a voicemail and those features related to the callee/user processing through the recorded missed calls and associated voicemails. The first set of features is displayed above the dashed line and the second set of features is provided below the dashed line.

The process begins at block 202, at which the phone device registers an incoming call and retrieves the call notification identifier (NID) of that call. According to one embodiment, each phone call may be uniquely identified via a unique ID that is created by the caller's phone. The caller (calling number) is assigned or provides a unique ID other than the calling number. The NED is then utilized to link any related messages to the missed call. When the missed call results in a voicemail, the unique ID is used to flag the voicemail, and the specific voicemail is subsequently displayed with this flag.

Users of phones may establish their own unique IDs and/or the phone device's user may also assign unique IDs to known numbers (or known callers). In one implementation, the unique ID (i.e., the NID) is sent from the caller's phone to the callee's phone through a side band channel during the placement of the call.

The MCVNR utility activates whenever the phone device, programmed with the MCVNR utility, receives a call, and the utility automatically retrieves (takes note of) the associated NID. Whenever the callee/user answers a call, MCNVR functions are not activated as no missed call occurs (i.e., no voicemail is recorded and no voicemail notification is generated).

Returning to the flow chart, at block 204, a determination is made whether the received call is answered by the callee/user of the phone device, and if yes, the call is registered as an answered/received call and the process ends at block 208. If the call is not answered, however, a next determination is made at block 210 whether the call was forwarded to voicemail. If the call is not answered, but no voicemail is recorded (e.g., when the caller hangs up before leaving a voicemail), then the call is simply recorded as a missed call, as shown at block 212 and the process ends at block 208.

However, when the call is forwarded to voicemail, and a voicemail is recorded, the NID is forwarded/associated with the voicemail, as indicated at block 214. Then at block 216, the voicemail-notification function of the phone's voicemail utility signals the receipt of the voicemail along with NID tagged to the notification. In one embodiment, the NID is forwarded via the sideband data channel as described above. Thus the NID is automatically included in the voicemail notification packet. In this way, the NID is utilized to automatically link the voicemail to the particular missed call and provide the callee of instant notification of this connection. Assuming the user looks at the voicemail notification, the user is provided direct identifying information about which caller left the voicemail, without having to go into the voicemail mailbox and listen to the message header.

In one embodiment, when multiple voicemails are recorded before the user is able to check the phone device, the user is able scroll up through the voicemail notification(s) in order to view each call the resulted in a voicemail for which a notification was generated (i.e., those voicemails received since the last time the user check voicemail or acknowledged a voicemail notification).

Returning again to FIG. 2 (and specifically those features illustrated below the dashed line), the callee's/user's response to the voicemail notification may further be enhanced by enabling granular access to the voicemail as is now described. As shown at block 218, a determination is later made by the utility whether the user acknowledges the voicemail notification or initiates access to the voicemail. If the user acknowledges the voicemail notification, then a list of missed calls is displayed along with the voicemail notification icon next to those particular missed calls that generated a voicemail, as shown at block 220. Then, access to voicemail is enabled from the displayed list as shown at block 226. Notably, in the illustrative embodiment, the voicemail access may be on a granular level, enabling the user to selectively determine which, if any, voicemail to listen to by scrolling to and selecting the particular missed call tagged with voicemail notification. Also, in another embodiment, the user may selectively delete a voicemail without actually accessing the voicemail. This function is provided via a selectable option provided by the utility when the voicemail notification is being displayed.

Also, the utility determines at block 222 whether the user accesses the received/missed call log on the phone device. If the user accesses the missed call log, then the list of missed (received) calls is displayed along with respective voicemail notification(s), indicating which missed calls resulted in a recording of a voicemail, as indicated at block 224. Then, access to voicemail is enabled from the displayed list as shown at block 226, which access may be made on a granular level, enabling the user to selectively determine which, if any, voicemail to listen to by scrolling to and selecting the particular missed call (with voicemail notification). The decision whether to first listen to voicemail before returning the call is thus made simpler and less time intensive.

Thus, while viewing a missed call log, the user is provided with a visual notification of whether the missed call has an associated voicemail (or SMS text message). The user is then able to utilized the visual "link" to access voicemail, perform a fine-grained voicemail access for the particular message, or link to a text voice mail header. Alternatively, for SMS messages, the user is also provided the link to directly access the SMS message(s). Then, once the user has listened to the voicemail (and/or read the text message header) associated with the particular call, the utility stops reporting the associated missed call as being un-reviewed in the missed call log of the phone device and may also remove the voicemail notification displayed next to the missed call, in one embodiment.

In one embodiment, the invention enables best-guess linking of missed call times with voicemail notifications. The phone device generates a best guess about who (which call) resulted in the voicemail being left based on the missed call time compared against the time of the voicemail notification. The phone device may also track the state of the voicemail inbox. This tracking requires the phone device receive some additional information with the voicemail notification, including the number of messages and caller phone numbers.

In yet another embodiment, after a call is placed, but before the call is connected, the phone server is able to ping the voicemail server and verify that there are no messages from that number on the voicemail. If there is no voicemail from the number being called, no action is taken/required. If, however, there is a voicemail from the number being called, the caller is either prompted or sent directly to voicemail to listen to the voicemail from the call number.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a telephone device, a method comprising:
receiving a call from a caller, wherein the call has an associated unique notification identifier (NID);
in response to the call not being answered at the telephone device, forwarding the call to a message storage facility at which the caller is allowed to leave a message, wherein the message is one or more of a voicemail, a video message, and a text message;
in response to the caller leaving the message, associating the NID with the message; placing the NID within a missed call log to provide unequivocal identification of a corresponding missed call;
displaying a notification of the message along with the NID on a display device, such that unequivocal identification of a source of the message is provided;
in response to detecting initiation of a return call to a phone number corresponding to the NID associated with a missed call that has a voicemail message notification displayed along with the NID in the missed call log:
determining if there is a voicemail message from the phone number that has not yet been listened to; and
in response to there being a voicemail message that has not yet been listened to, issuing a prompt asking whether to access and play the voicemail message prior to initiating the return call to the phone number associated with the NID;
wherein: the NID is received as an SMS message during the call and provides unequivocal identification of the call received; and
the association of the NID with the message provides unequivocal and automatic identification of the corresponding missed call linked with the message on the display device.

2. The method of claim 1, further comprising:
in response to receiving an affirmative response to the prompt to listen to the voicemail, retrieving and playing the recorded voicemail message before connecting the return call.

3. The method of claim 2, wherein the determining, retrieving and playing the recorded voicemail message comprises checking a voicemail server for the voicemail.

4. The method of claim 1, further comprising:
enabling granular access to each message, wherein access to a particular message associated with a user-selected missed call number and NID is provided without replaying previous and/or subsequently recorded messages in a queue.

5. The method of claim 1, further comprising:
in response to a selection being received to display one of a missed call log and a received call log, displaying each missed call that resulted in a message with a message notification signal next to one of the call number and the NID, wherein access to the messages is enabled out-of-order relative to the order in which the messages were recorded.

6. The method of claim 1, further comprising:
in response to the phone device receiving a selection of the voicemail retrieval option when an un-opened voicemail exists within the voice mailbox:
generating a list of missed calls with an associated, unopened voicemail;
displaying the list on the phone display while authenticating access to the voice mailbox;
enabling user selection of a specific one of the voicemails by selecting the associated one of the missed calls on the generated list; and
providing direct access to that specific one of the voicemails within the voice mailbox, wherein access to a particular message associated with a user-selected missed call number (or NID) is provided without replaying previous and/or subsequently recorded messages in queue to be retrieved.

7. The method of claim 1, further comprising:
in response to an associated voicemail being accessed and played for a user to listened to, removing the voicemail notification displayed next to the missed call within the missed call log.

8. The method of claim 1, further comprising:
in response to completion by a user of a review of the message associated with a particular call, stopping a reporting of the associated missed call as being unreviewed in the missed call log, wherein the completion comprises one of (a) playing a voicemail message and (b) displaying a header of a text message for a user to read.

9. A machine readable device comprising program code that when executed within a communication device configures the communication device to perform the method of claim 1.

10. A machine readable device comprising program code that when executed within a communication device configures the communication device to perform the method of claim 2.

11. In a telephone device, a method comprising:
receiving a call from a caller, wherein the call has an associated unique notification identifier (NID);
in response to the call not being answered at the telephone device, forwarding the call to a message storage facility at which the caller is allowed to leave a message, wherein the message is one or more of a voicemail, a video message, and a text message;
in response to the caller leaving the message, associating the NID with the message;
placing the NID within a missed call log to provide unequivocal identification of a corresponding missed call;
displaying a notification of the message along with the NID on a display device, such that unequivocal identification of a source of the message is provided;
in response to detecting initiation of a return call to a phone number corresponding to the NID associated with a missed call that has a voicemail message notification displayed along with the NID in the missed call log:
determining if there is a voicemail message from the phone number that has not yet been listened to; and
in response to there being a voicemail message that has not yet been listened to, forwarding the caller directly to voicemail to listen to the voicemail message prior to connecting the return call to the phone number;
wherein: the NID is received as an SMS message during the call and provides unequivocal identification of the call received; and
the association of the NID with the message provides unequivocal and automatic identification of the corresponding missed call linked with the message on the display device.

12. A machine readable device comprising program code that when executed within a communication device configures the communication device to perform the method of claim 11.

13. A communication device comprising:
- a processor;
- a memory coupled to the processor; and
- a utility having program code that when executed on the processor causes the communication device to:
    - receive a call from a caller, wherein the call has an associated unique notification identifier (NID);
    - in response to the call not being answered at the telephone device, forward the call to a message storage facility at which the caller is allowed to leave a message, wherein the message is one or more of a voicemail, a video message, and a text message;
    - in response to the caller leaving the message, associate the NID with the message;
    - place the NID within a missed call log to provide unequivocal identification of a corresponding missed call;
    - display a notification of the message along with the NID on a display device, such that unequivocal identification of a source of the message is provided;
    - in response to detecting initiation of a return call to a phone number corresponding to the NID a missed call that has a voicemail message notification displayed along with the NID in the missed call log:
        - determine if there is a voicemail message from the phone number that has not yet been listened to; and
        - in response to there being a voicemail message that has not yet been listened to, forward the caller directly to voicemail to listen to the voicemail message associated with the NID prior to connecting the return call;
    - the NID is received as an SMS message during the call and provides unequivocal identification of the call received; and
    - the association of the NID with the message provides unequivocal and automatic identification of the corresponding missed call linked with the message on the display device.

14. The communication device of claim 13, wherein forwarding the caller to voicemail comprises:
- first issuing a prompt asking whether to access the voicemail message prior to initiating the return call to the phone number associated with the NID; and
- in response to receiving an affirmative response to the prompt to listen to the voicemail, retrieving and playing the recorded voicemail message before connecting the return call.

15. The communication device of claim 14, wherein the determining, retrieving and playing the recorded voicemail message comprises checking a voicemail server for the voicemail.

16. The communication device of claim 13, further comprising:
- enabling granular access to each message, wherein access to a particular message associated with a user-selected missed call number and NID is provided without replaying previous and/or subsequently recorded messages in a queue.

17. The communication device of claim 13, further comprising:
- in response to a selection being received to display one of a missed call log and a received call log, displaying each missed call that resulted in a message with a message notification signal next to one of the call number and the NID, wherein access to the messages is enabled out-of-order relative to the order in which the messages were recorded.

18. The communication device of claim 13, further comprising:
- in response to the phone device receiving a selection of the voicemail retrieval option when an un-opened voicemail exists within the voice mailbox:
    - generating a list of missed calls with an associated, unopened voicemail;
    - displaying the list on the phone display while authenticating access to the voice mailbox;
    - enabling user selection of a specific one of the voicemails by selecting the associated one of the missed calls on the generated list; and
    - providing direct access to that specific one of the voicemails within the voice mailbox, wherein access to a particular message associated with a user-selected missed call number (or NID) is provided without replaying previous and/or subsequently recorded messages in queue to be retrieved.

19. The communication device of claim 13, further comprising:
- in response to an associated voicemail being accessed and played for a user to listened to, removing the voicemail notification displayed next to the missed call within the missed call log.

20. The communication device of claim 13, further comprising:
- in response to completion by a user of a review of the message associated with a particular call, stopping a reporting of the associated missed call as being un-reviewed in the missed call log, wherein the completion comprises one of (a) playing a voicemail message and (b) displaying a header of a text message for a user to read.

* * * * *